United States Patent [19]

Schofield et al.

[11] Patent Number: 5,753,022
[45] Date of Patent: May 19, 1998

[54] PROCESS

[75] Inventors: John David Schofield, Bury; Dean Thetford, Rochdale, both of United Kingdom

[73] Assignee: Zeneca Limited, London, England

[21] Appl. No.: 596,179

[22] PCT Filed: Dec. 20, 1994

[86] PCT No.: PCT/GB94/02786

§ 371 Date: Feb. 5, 1996

§ 102(e) Date: Feb. 5, 1996

[30] Foreign Application Priority Data

Dec. 23, 1993 [GB] United Kingdom ............ 9326374

[51] Int. Cl.⁶ .................................. C09B 67/50
[52] U.S. Cl. .............. 106/412; 106/410; 106/411; 106/413; 106/31.76; 106/31.77; 106/31.78
[58] Field of Search ................. 106/412, 410, 106/411, 413, 31.76, 31.77, 31.78

[56] References Cited

U.S. PATENT DOCUMENTS

| | | | |
|---|---|---|---|
| 2,816,115 | 12/1957 | Howell | 106/412 |
| 3,996,059 | 12/1976 | Stansfield et al. | 106/413 |
| 4,057,436 | 11/1977 | Davies et al. | 106/410 |
| 4,522,654 | 6/1985 | Chisvette et al. | 106/412 |
| 5,175,282 | 12/1992 | Roth et al. | 540/141 |
| 5,284,511 | 2/1994 | Rolf et al. | 106/412 |

FOREIGN PATENT DOCUMENTS

| | | |
|---|---|---|
| 023 387 | 2/1981 | European Pat. Off. . |
| 407 831 | 1/1991 | European Pat. Off. . |
| 551 766 | 7/1993 | European Pat. Off. . |
| 2 166 219 | 8/1973 | France . |
| 2 285 443 | 4/1976 | France . |

OTHER PUBLICATIONS

Database WPI, Section Ch, Week 8824, Derwent Publications Ltd., Class E23, AN 88-124791 & DD.A.243 182. Feb. 25, 1987 see abstract.

Primary Examiner—Mark L. Bell
Assistant Examiner—Scott L. Hertzog
Attorney, Agent, or Firm—Pillsbury Madison & Sutro LLP

[57] ABSTRACT

A method of preparing a non-aqueous dispersion of CuPc which comprises milling crude CuPc in a high boiling liquid at a temperature from 50° to 150° C. in the presence of a polyester amine or polyesterammonium salt and a CuPc fluidising agent. Preferred polyesterammonium salt is obtainable by reacting polyhydroxystearic acid with 3-dimethylaminopropylamine quaternised with dimethylsulphate.

15 Claims, No Drawings

PROCESS

This application claims benefit of international application PCT/GB94/02786, filed Dec. 20, 1994.

The present invention related to a process for making a non-aqueous dispersion (NAD) of a copper phthalocyanine (CuPc) which is especially suitable for direct incorporation into a printing ink.

In order to disperse pigments uniformly in a non-aqueous medium especially designed dispersing agents are required to produce dispersions having acceptable viscosity and stability properties, which when incorporated into printing inks give inks with acceptable flow characteristics. Thus, GB 1,373,660 discloses polyesteramine dispersants obtainable by reacting poly(hydroxycarboxylic acids) (hereinafter PHCA) with diamines, especially alkylenediamines, and salts thereof. GB 2,001,083 discloses polyesteramine dispersants obtainable by reacting PHCA with poly($C_{2-4}$-alkyleneimine) (hereafter PAI) and salts thereof. U.S. Pat. No. 5,000,792 discloses polyesteramine dispersants obtainable by reacting 2 parts of PHCA with 1 part of a di-alkylenetriamine. NAD containing high concentrations of pigment often exhibit high viscosity and are difficult to handle and formulate into inks and paints. It has therefore been proposed to incorporate fluidising agents into such NAD's as disclosed in GB 1,508,576 (U.S. Pat. No. 4,057,436).

Offset inks and varnishes are presently made by first converting crude CuPc to pigmentary CuPc by salt milling in the presence of a water-miscible solvent such as ethylene glycol followed by washing with water to form a press paste which is either (1) dried and dispersed in an aliphatic medium or oil and formulated into an ink or (2) flushed into the aliphatic medium to make a "flush" colour which is then incorporated into the aliphatic medium to form the printing ink or varnish. The direct dispersion of crude CuPc into the aliphatic medium is difficult to achieve and the salt grinding process is expensive and produces an effluent which poses an environmental hazard. There is a clear advantage of avoiding salt milling by milling the crude CuPc in the solvent medium itself.

It has recently been proposed, in U.S. Pat. No. 5,175,282, to mill crude CuPc in 1 to 10% of an organic solvent at elevated temperature and then heat the milled paste in an aqueous medium in order to obtain pigmentary CuPc which when formulated in compositions such as surface coatings and printing inks exhibits improved flow characteristics compared with compositions containing dry-ground CuPc pigments.

It has now been found that brighter and greener shades of CuPc in inks and varnishes are obtainable in NAD if the crude CuPc is milled with dispersing agents in a non-aqueous solvent itself at a temperature above 50° C.

Thus, according to the invention there is provided a method of preparing a NAD of CuPc which comprises milling crude CuPc in a high boiling liquid at a temperature from 50° to 150° C. in the presence of a) a polyesteramine or polyesterammonium salt obtainable by the reaction of an amine with a PHCA of formula (1)

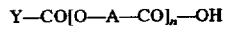

wherein
A is divalent hydrocarbyl;
Y is hydrogen or optionally substituted hydrocarbyl;
n is from 1 to 100; and b) a CuPc fluidising agent.

The precise structure of the chain terminating group Y is not critical provided it is inert to the other components of the composition under the normal processing conditions to which it is subjected. It is preferably free from ionic and strongly polar groups and preferably has a molecular weight of less than 300 and contains only C and H or C, H and O atoms.

The optionally substituted hydrocarbyl group Y is preferably alkyl or alkenyl containing up to 35 carbon atoms, especially from 7 to 25, and more especially from 7 to 20 carbon atoms such as heptyl, octyl, undecyl, lauryl, heptadecyl, heptadecenyl, heptadecadienyl, stearyl, oleyl, linoleyl or such a group substituted by a hydroxy, halo or alkoxy group, especially $C_{1-4}$ alkoxy. Other values for Y include, $C_{4-8}$-cycloalkyl, such as cyclohexyl; polycycloalkyls, for example, polycyclic terpenyl groups which are derivable from naturally occurring acids such as abietic acid; aryl, such as phenyl; aralkyl, such as benzyl and polyaryl, such as naphthyl, biphenyl, stilbenyl and phenylmethylphenyl. Such groups are preferably unsubstituted or substituted by a group selected from hydroxy, halogen and $C_{1-4}$-alkoxy. Particularly preferred terminal groups Y—CO— are 12-hydroxystearyl and 12-hydroxyoleyl.

The divalent hydrocarbyl represented by A may be an aromatic, aliphatic or cycloaliphatic group. It is preferably an alkylene or alkenylene group, especially one containing from 4 to 25 carbon atoms with at least 4 carbon atoms between the oxygen atom and carbonyl group. Preferably n has a value of at least two. When n is greater than one, the groups represented by A in the polyester chain $[O—A—CO]_n$ may be the same or different. When the group A is an aliphatic chain containing nine or more carbon atoms it is preferred that n is from 1 to 10, and especially from 1 to 6. When the group A is an aliphatic chain containing up to eight carbon atoms it is preferred that n is from 1 to 60. The groups represented by A may carry other substituents which do not confer water-solubility on the molecule, such as halogen and alkoxy. Preferred examples of the group (—O—A—CO) are 12-oxystearyl, 12-oxyoleyl and 6-oxycaproyl.

The PHCA of formula I is conveniently derived from a mixture of (i) a saturated or unsaturated aliphatic hydroxycarboxylic acid containing from 4 to 25 carbon atoms having at least 4 carbon atoms between the hydroxy and carboxyl groups or a cyclic precursor thereof, such as a lactone and (ii) one or more aliphatic carboxylic acids of the formula Y-COOH, where Y is as hereinbefore defined. Examples of suitable hydroxycarboxylic acids and precursors are 12-hydroxystearic acid, 12-hydroxy-9-oleic acid (ricinoleic acid), 6-hydroxycaproic acid and ε-caprolactone Examples of suitable acids from which the end group —Y—CO— is derivable, by reaction with a terminal hydroxy group on the polyester chain, are lauric acid, palmitic acid, stearic acid and 9-oleic acid and mixtures containing these acids which are derivable from natural products. Preferred PHCA's are poly(12-hydroxystearic acid), poly(ricinoleic acid) and poly(6-hydroxycaproic acid), hereinafter PHS, PR and PHC respectively. PHS is especially preferred.

The amine which reacts with the PHCA contains at least one group which is reactable with a carboxylic acid group of the PHCA, and is preferably a hydroxy and especially an amino group which may be either primary or secondary amino. The amine may contain both hydroxy and amino groups as in alkanolamines or it may contain only amino groups as in alkylenediamines or PAI.

A first preferred dispersant is a polyesteramine of formula (2):

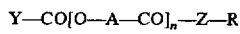  (2)

wherein

Y, A and n are as hereinbefore defined;

Z is a divalent bridging group; and

R is an amino or ammonium group.

The divalent bridging group, Z, is preferably of the formula (3) or (4):

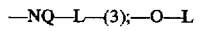  (4)

wherein

Q is hydrogen or alkyl and L is an alkylene or hydroxyalkylene group, or, when (2) is of formula (3), N, Q and L, together with the group R form a cycloheteroaliphatic group. The group Q preferably contains up to 25 carbon atoms. The alkylene group which is, or which is present in, the group L preferably contains from 2 to 6 carbon atoms. Examples of the group represented by Q are methyl, ethyl, n-propyl, n-butyl and octadecyl and examples of the group represented by L are —(CH$_2$)$_2$—, —(CH$_2$)$_4$—, —(CH$_2$)$_6$—, and —CH$_2$—CHOH—CH$_2$— and an example of the cycloheteroaliphatic bridging group is piperazin-1,4-ylene.

When the group R is an amino group, it may be a primary, secondary or tertiary amino group and is preferably of the formula (5):

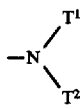  (5)

wherein

T$^1$ and T$^2$ are independently hydrogen, C$_{1-22}$-alkyl, substituted C$_{1-22}$-alkyl, aralkyl or cycloalkyl; or T$^1$ and T$^2$ together with the nitrogen atom to which they are attached form a 5- or 6- membered ring.

When T$^1$ or T$^2$ is alkyl, it is preferably C$_{1-6}$-alkyl, such as methyl. When T$^1$, T$^2$ and the nitrogen atom form a ring it is preferably piperidinyl, morpholinyl or especially an N-alkylpiperazinyl. When T$^1$ or T$^2$ is aralkyl, it is preferably benzyl.

When the bridging group Z together with R forms a cycloheteroaliphatic group, one of T$^1$ or T$^2$ is incorporated into the bridging group. Thus, the group —Z—R may be of the formula (6):

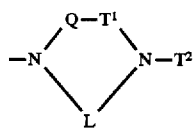  (6)

It is preferred that both T$^1$ and T$^2$ are other than hydrogen, so that R is tertiaryamino.

When the group R is an ammonium group, it is preferably of the formula (7):

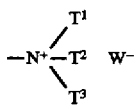  (7)

wherein

T$^3$ is hydrogen, C$_{1-22}$-alkyl, substituted C$_{1-22}$-alkyl, aralkyl or cycloalkyl; and W is a colourless anion.

The polyesterammonium salt is conveniently formed from the polyesteramine by reaction with an acid or quaterising agent.

The acids used to form the polyesterammonium salt may be inorganic or organic and include hydrochloric, sulphuric, acetic, formic, methanesulphonic, benzenesulphonic and benzoic acids. Preferably, the anion is methanesulphonic acid.

Preferred quaterising agents are dialkyl sulphates where the alkyl groups contain from 1 to 4 carbon atoms. An especially preferred quaterising agent is dimethylsulphate.

The polyesteramine or polyesterammonium salt is obtainable by reacting at least one PHCA with an appropriate amine in a suitable solvent followed by reaction with a salt or quaterising agent. Such compounds may be prepared by any of the processes described in GB Patent Nos. 1,342,746, 1,373,660, EP 127,325 and EP 23387 and all such dispersants are incorporated herein by reference.

Particularly useful effects have been obtained when the polyesteramine is obtained as a quaternary ammonium salt by reacting 2 moles of PHS with 1 mole of 3-dimethylaminopropylamine and subsequently quaterising with dimethylsulphate (hereinafter Dispersant 1). Dispersant 1 may be prepared by the method in EP 23387.

A second preferred dispersant is obtainable by the reaction of a PHCA of formula I with a PAI to form a PAI derivative in which at least two PHCA's are attached to each PAI chain. The PHCA is as described hereinbefore.

The PAI may be linear or branched, but is preferably branched, with at least 20% of the nitrogen atoms present as tertiary amino groups. The molecular weight of the PAI is generally greater than 500, preferably greater than 5,000 and especially greater than 10,000. The molecular weight is preferably less than 200,000, more preferably less than 100,000 and especially less than 50,000.

A preferred PAI is polyethyleneimine (hereinafter PEI). The second preferred dispersant is obtainable by reacting up to 50 parts, preferably up to 30 parts, more preferably up to 10 parts and especially up to 5 parts of a PHCA with one part of a PAI wherein all parts are by weight.

The preparation of dispersants of this type are described in GB 2,001,083 and all such dispersants are imported herein by reference.

A particularly useful dispersant of this type is that obtainable by reacting 3 parts of PHS with 1 part PEI having a molecular weight of about 20,000 (hereinafter Dispersant 2). Dispersant 2 may be prepared by the method described for Agent C in GB 2,001,083 except that a PEI with MW of 20,000 is used in place of the PEI with MW of 50,000.

A third preferred dispersant is that obtainable by reacting a PHCA of formula I with an amine of formula (8)

  (8)

wherein

R$^1$ and R$^2$ are each independently C$_{2-6}$-alkylene; and

R$^3$ is C$_{1-2}$-alkyl; and where 0.8 to 1.0 molar equivalents of the amino groups are reacted with the PHCA.

Examples of amines of formula 8 are N,N-bis(aminoethyl)-methylamine; N,N-bis (aminopropyl) methylamine; N,N-bis(aminobutyl)methylamine; N,N-bis(aminoethyl)ethylamine; N,N-bis(aminopropyl)ethylamine; N,N-bis(aminobutyl)ethylamine and N-(aminomethyl)-N-(aminoethyl)-methylamine.

The preferred PHCA is PHS.

The preparation of compounds of this type are described in GB 5,000,792 and all such dispersants are incorporated herein by reference.

The CuPc fluidising agent is preferably at least partially soluble in the high-boiling liquid and comprises a substituted ammonium salt of a CuPc acid wherein there are from 19 to 60 carbon atoms contained in at least 3 chains attached to the nitrogen atom of the substituted ammonium ion:

Preferably, the CuPc fluidising agent contains at least four organic chains attached to each nitrogen atom of each substituted ammonium ion and these chains preferably contain, in total, between 25 and 40 carbon atoms. It is further preferred that at least one and more preferably two of the chains are alkyl or alkenyl groups containing at least 8 and preferably at least 12 carbon atoms, especially those groups containing between 12 and 20 carbon atoms.

The CuPc acid may be any CuPc molecule containing —COCOH groups or more especially —SO₃H groups which is capable of forming a salt with an amine or substituted ammonium salt to form the substituted ammonium salt of the CuPc acid. The CuPc acid is preferably mono- or disulphonic or more especially a mixture thereof containing on average from 1.0 to 1.6 and especially from 1.1 to 1.5 sulphonic acids for each CuPc molecule.

Examples of amines and substituted ammonium salts which may be used to form the CuPc fluidising agent are tertiary amines and quaternary ammonium salts such as N,N-dimethyloctadecylamine, cetyl-trimethylammonium bromide, didodecyldimethylammonium chloride and dioctadecyldimethylammonium chloride.

Alternatively, the amines or substituted ammonium salts may contain polyester chains such as the amine and amine salts of the dispersants as described hereinbefore.

The amines and substituted ammonium salts may be cyclised wherein at least two of the organic chains are linked to form a ring containing the nitrogen atom which will form the charge centre of the substituted ammonium ion. The ring or rings so formed may be aliphatic rings such as piperidine or aromatic rings such as pyridine and as examples of such amines or salts there may be mentioned N-cetylpiperidine.

One or more of the organic chains attached to the N-atom of the amine or substituted ammonium ion may be substituted by aromatic groups such as phenyl and substituted phenyl radicals which are free from acidic groups e.g. benzyldimethyloctadecylammonium chloride. Alternatively one or more of the organic chains may contain other nonacidic substituents such as hydroxy groups e.g. octadecylbis(2-hydroxyethyl)amine, amino or substituted amino e.g. 3(N-octadecyl-N-hydroxyethylamino) propyl-N'N'bis(2-hydroxyethyl)amine thus forming polyamines to one of the N-atoms of which is attached at least 3 organic chains containing a total of at least 16 carbon atoms.

The preparation of the CuPc fluidising agent is described in GB 1,508,576(U.S. Pat. No. 4,057,436) and all such agents are imported herein by reference.

Particularly useful effects have been obtained when the fluidising agent is the dioctadecyldimethylammonium salt of a sulphonated CuPc containing an average of 1.3 sulphonic acid groups (hereinafter Fluidising Agent 1). The preparation of this is described as Agent A of GB 1,508,576.

The high boiling liquid may be any of those commonly used in the trade for making printing inks especially offset inks and varnishes. It may be aliphatic or aromatic in character and is preferably a mixture of aliphatic and aromatic distillates where the latter is in the smaller proportion than the former. The aliphatic distillate is typically a coal-tar distillate and preferably has a boiling point between 200° and 360° C. Typical specific gravities are from 0.75 to 0.85. The chemical composition of such aliphatic distillates has not been precisely determined, but the MW of the components is typically between about 170 and 320. Some of the aliphatic distillates contain small amounts of aromatic components and this is especially preferred in the process according to the present invention. Examples of commercially available high boiling aliphatic distillates are those available from Magie Bros Oil Company, USA (e.g. MagieSol 47 and 52) and those available from Carless Refining Ltd, UK under the Paraset trade mark (e.g. Paraset 29L).

The high boiling aromatic distillate preferably has a boiling point similar to that of the aliphatic distillate and also a specific gravity which is typically between 0.7 and 1.2. Examples of high boiling aromatic distillates include benzene substituted by aliphatic chains containing up to 30 carbon atoms, especially up to 20 carbon atoms. These aliphatic chains may be linear or branched. Other suitable aromatic distillates are esters obtainable from phthalic acid or phthalic anhydride such as dimethylphthalate and esters obtainable from benzalmalonates such as diethylbenzalmalonate.

The process according to the present invention may be carried out in a high energy bead mill. Any bead mill commonly used in the trade may be used provided that in operation a temperature in excess of 50° C. is obtainable. This may be achieved by external heating with a heated jacket or be exploiting the heat generated during operation of the mill. A suitable bead mill is a Netzsch LMJI mill. It is preferred that milling is carried out above 75° C. and especially above 90° C.

The diameter of the beads depends to a large extent on the type of mill used. Thus, in an attritor bead mill which is open to the atmosphere and has a low relative speed, the diameter of the beads is preferably greater than 2 mm and also preferably less than 5 mm and especially less than 3 mm. However, in a Netzsch mill which is totally enclosed and has a much greater relative speed, the diameter of the beads is preferably not greater than 2 mm, more preferably less than 1 mm and especially less than 0.5 mm, for example 0.25 mm.

Milling of the crude CuPc is continued until the mean particle size is below 50 microns, preferably below 20 microns and especially below 10 microns.

As noted hereinbefore, printing inks or varnishes obtained using the process of the present invention produce clear greenish blue shades which are greener and brighter than those obtained when milling is carried out at below 50° C. or by milling solely in a high boiling aliphatic distillate containing no high boiling aromatic distillate. However, the greenest and brightest shades are obtainable when milling is carried out in a high-boiling aliphatic distillate which also contains an aromatic distillate and at temperatures above 500° C. It has also been found that the amount of CuPc fluidising agent can be decreased as the milling temperature is increased.

The NAD also preferably contains an alkyd resin to improve the compatibility and stability of the NAD when let down into an ink or varnish. The alkyd resin may be any suitable resin which is commonly used in the trade, but is preferably a "long oil" alkyd resin obtainable by reacting a long chain saturated or unsaturated fatty acid with a polyol and a di- or tri-carboxylic acid or their anhydrides. The carboxylic acids are preferably aromatic in character, for example phthalic acid or trimellitic anhydride. Preferred fatty acids are $C_{16-18}$-aliphatic acids which may be saturated or unsaturated.

The NAD typically contains at least 5%, preferably at least 10%, more preferably at least 15% and especially at least 25% by weight CuPc relative to the total weight of the NAD. It is also preferred that the NAD contains less than 70%, more preferably less than 60% and especially less than 45%-CuPc by weight relative to the total weight of the NAD.

It is also preferred that the NAD contains at least 0.5% dispersant, more preferably at least 1% and especially at least 2% by weight of the NAD. Although the amount of dispersant in the NAD can be the same as the amount of crude CuPc it is not generally necessary to use this amount. Consequently, it is preferred that the amount of the dispersant is less than 25%, more preferably less than 15% and especially less than 10% by weight of the NAD.

The CuPc fluidising agent is preferably at least 0.1%, more preferably at least 0.3% and especially at least 0.5% by weight of the NAD. Typically, the fluidising agent is less than 10%, preferably less than 5% and especially less than 3% by weight of the NAD.

The high boiling liquid is preferably at least 20%, more preferably at least 30% and especially at least 40% by weight of the NAD. Typically, the distillate is less than 90%, preferably less than 60%, more preferably less than 70% and especially less than 60% of the NAD. The high boiling distillate may be aliphatic or aromatic in nature or preferably a mixture of both. When the high boiling liquid is a mixture of aliphatic and aromatic distillates in which the latter is the smaller proportion it preferably contains at least 0.1%, preferably at least 0.3% and especially at least 0.5% aromatic distillate based on the total weight of the NAD. It is also preferably less than 10%, more preferably less than 7% and especially less than 5% by weight, of the NAD.

When the NAD contains an alkyd resin, the resin is typically at least 0.1%, preferably at least 0.3% and especially at least 0.5% by weight of the NAD. The resin is preferably less than 10%, more preferably less than 7% and especially less than 5% by weight of the NAD.

As noted hereinbefore, the NAD prepared in accordance with the process of the present invention gives clearer and greener shades of CuPc in a high-boiling liquid than those obtained hitherto. The invention therefore also provides a composition obtainable by a process according to the present invention as described hereinbefore.

The NAD obtainable by the process of the present invention is suitable for use in the formulation of printing inks, especially off-set inks, and varnishes to give a clear, bright greenish blue image.

The NAD made by the process according to the invention may be diluted with a solvent based ink or with a white ink and used directly for printing. The ink may additionally contain any other adjuvants commonly used in printing, particularly off-set printing. The present invention also provides a clear, bright greenish blue image by application of the NAD to a substrate.

The invention is now further described in the following examples where all references to amounts are to parts by weight unless stated to the contrary.

Preparation of Polyester A

A mixture of xylene (348 parts) and a commercial grade of 12-hydroxystearic acid (3350 parts; having acid and hydroxyl values of 182 mg.KOH/gm and 160 mg.KOH/gm respectively) is stirred for 22 hours at 190° to 200° C., the water formed in the reaction being separated from the xylene in the distillate which is then returned to the reaction medium. After 152 parts of water have been collected, the xylene is removed by heating at 200° C. in a stream of nitrogen. The resulting pale amber coloured liquid has an acid value of 35.0 mgms/KOH/gm.

Preparation of Dispersant 1

A mixture of polyester A (320 parts), 3-dimethylaminopropylamine (10.2 parts) and toluene (65 parts) was stirred under reflux and under a current of nitrogen using a Dean & Stark head to remove water. The temperature was raised to 165° C. and held at this temperature for 6 hours. After cooling to 20° to 25° C. under nitrogen, an 87.6% solution of the adduct was obtained.

226 parts of this adduct was stirred at 40° C. and dimethylsulphate (6.7 parts added). An exotherm raised the temperature to 500° C. which was further raised to 90° C. by external heating. After holding at 90° C. for a further 90 minutes the reaction mass was cooled to 20°–25° C. No free dimethylsulphate was detectable by gas/liquid chromatography. This is Dispersant 1.

Preparation of Dispersant 2

Hydroxystearic acid (159 parts) was polymerised by stirring at 170°–180° C. in the presence of tetrabutyltitanate (1 part) as catalyst under a nitrogen atmosphere in a vessel equipped with a Dean and Stark separator until the polymer has an acid value of about 35 mg KOH/gm.

Polyhydroxystearic acid (159 parts) prepared as above and highly-branched polyethyleneimine (53 parts, Polymin ex BASF) were stirred at 120° C. under nitrogen for about 3 hrs until the product had an acid value of 16–20 mg KOH/gm. On cooling, the product was obtained as a brown gum.

Preparation of Fluidising Agent 1

To a slurry of 300 parts of a filter cake containing 85.6 parts of copper phthalocyanine sulphonic acid which contains, on average, 1.3 sulphonic acid groups per copper phthalocyanine nucleus in 3,700 parts of water at 70°–75° C. was added 56 parts of triethanolamine followed gradually by 78.6 parts of a commercially available 75% solution in isopropanol of didodecyldimethylammonium chloride (Arquad 2C/75; Arquad is a Registered Trade Mark). When these additions are complete 50 parts of 34% acetic acid was added and the precipitate was filtered off, washed with water and dried. The product was sparingly soluble in toluene.

EXAMPLE 1

Crude CuPc (70 parts) and Fluidising Agent 1 (2 parts) was added to a solution of Dispersant 1 (8 parts), alkyd resin (10 parts; Terlon 3 supplied by Lawters) and dodecylbenzene (6 parts) in an aliphatic high-boiling distillate (104 parts; Paraset 29L as supplied by Carless Refining Ltd, UK). The above mixture was milled together in a stainless steel attritor Model 01-HD (Union Process, Ohio, USA) containing 3 mm diameter stainless steel balls (380 ml). The attritor was heated to 110° C. by passing steam through the water jacket and milling continued for 18 hours at 400 rpm with a tip speed of 1.3 ms$^{-1}$.

COMPARATIVE EXAMPLE A

The procedure of Example 1 was repeated with the exception that milling was carried out in the absence of dodecylbenzene using the Paraset aliphatic distillate alone (110 parts) and maintaining a temperature of 45° C. throughout using external cooling.

EXAMPLE 2

Example 1 was repeated but maintaining a milling temperature of 70° C. throughout.

EXAMPLE 3

Example 2 was repeated except that the dodecylbenzene was replaced by the same amount of dimethylphthalate.

EXAMPLE 4

Example 2 was again repeated except that the dodecylbenzene was replaced by the same amount of diethylbenzalmalonate.

EXAMPLE 5

Example 2 was repeated except that the dodecylbenzene was replaced by the same amount of dimethylphthalate and dispersant 1 was is replaced by the same amount of dispersant 2.

EXAMPLES 6 TO 10 AND COMPARATIVE EXAMPLE B
EXAMPLES OF NADs IN PRINTING INKS

The NADs of the above examples (1 part) was mixed with a white ink previously prepared from titanium dioxide pigment (18 parts, Tioxide RCR2) Dispersant 1 (0.4 parts), zinc/calcium rosinate (5.4 parts, Pexate RT3) and toluene (6.56 parts). The prepared ink was coated onto butakon coated paper with a number 2 K-bar using an automatic coater (Model KCC 202, RK Print-Coat Instruments, UK). After drying the colour co-ordinates of the various prints were measured using a Chroma Meter CR-221 (Minolta, UK). The results are given in Table 1 below which show that the inks prepared by milling at temperatures above 70° C. and especially those also containing an aromatic high-boiling distillate exhibit greener and clearer shades than those obtained by milling at lower temperatures and in the absence of the aromatic distillate.

TABLE 1

| Example | NAD | L | a | b |
|---|---|---|---|---|
| 6 | 1 | 59.09 | −15.93 | −38.12 |
| 7 | 2 | 59.26 | −14.95 | −38.08 |
| 8 | 3 | 59.00 | −15.41 | −38.37 |
| 9 | 4 | 58.52 | −15.33 | −38.24 |
| 10 | 5 | 59.86 | −15.14 | −38.20 |
| B | A | 60.36 | −14.81 | −35.79 |

We claim:

1. A method of preparing a non-aqueous dispersion of a CuPc which comprises milling crude CuPc in a high boiling liquid at a temperature from 50° to 150° C. in the presence of
   a) a polyester amine or polyesterammonium salt obtained by the reaction of an amine with a polyhydroxycarboxylic acid of formula (1)

$$Y-CO[O-A-CO]_n-OH \quad (1)$$

wherein
   A is divalent hydrocarbyl;
   Y is hydrogen or optionally substituted hydrocarbyl;
   n is from 1 to 100; and
   b) a CuPc fluidising agent.

2. A method according to claim 1 wherein the polyhydroxycarboxylic acid is obtained from 12-hydroxystearic acid, ricinoleic acid, 6-hydroxycaproic acid or ε-caprolactone.

3. A method according to either claim 1 or claim 2 wherein the polyesteramine or polyesterammonium salt is of formula (2)

$$Y-CO[O-A-CO]_n-Z-R \quad (2)$$

wherein
Y, A and n are as defined in claim 1;
Z is a divalent bridging group; and
R is an amino or ammonium group.

4. A method according to either claim 1 or claim 2 wherein the polyesteramine is obtained from the reaction of a polyhydroxycarboxylic acid and a poly($C_{2-4}$-alkyleneimine) wherein at least two poly hydroxycarboxylic acids are attached to each polyalkyleneimine chain.

5. A method as claimed in any one of claims 1 to 2 wherein the polyesterammonium salt is obtained by reacting 2 moles of polyhydroxystearic acid with 1 mole of 3-dimethylaminopropylamine subsequently quaternised with dimethylsulphate.

6. A method as claimed in any one of claims 1 to 2 wherein the polyesteramine is obtained by reacting 3 parts of polyhydroxystearic acid with one part of polyethylenimine having a MW of about 20,000.

7. A method as claimed in any one of claims 1 to 2 wherein the fluidising agent is a substituted ammonium salt of a CuPc wherein there are from 19 to 60 carbon atoms contained in at least 3 chains attached to the nitrogen atom of the substituted ammonium ion.

8. A method as claimed in claim 7 wherein the fluidising agent is the dioctadecyldimethylammonium salt of a sulphonated CuPc containing on average 1.3 sulphonic acid groups.

9. A method as claimed in any one of claims 1 to 2 wherein the high boiling liquid is an aliphatic distillate.

10. A method as claimed in claim 1 or 2 wherein the high boiling liquid is a mixture of a major proportion of an aliphatic distillate and a minor proportion of an aromatic distillate.

11. A printing ink comprising a non-aqueous dispersion prepared by a method according to any one of claims 1 to 2.

12. A method of preparing a non-aqueous dispersion of a CuPc which comprises milling crude CuPc in a high boiling liquid comprising an aliphatic distillate at a temperature from 50° C. to 150° C. in the presence of:
    (a) a polyester amine or polyesterammonium salt obtained by the reaction of an amine with a polyhydroxycarboxylic acid of formula (1)

$$Y-CO[O-A-CO]_n-OH \quad (1)$$

wherein
    A is divalent hydrocarbyl;
    Y is hydrogen or optionally substituted hydrocarbyl;
    n is from 1 to 100; and
    (b) a CuPc fluidising agent.

13. A method as claimed in claim 12 wherein the aliphatic distillate contains 0.1 to 10% aromatic distillate based on the weight of the non-aqueous dispersion.

14. A method as claimed in claim 1 wherein the amount of CuPc in the non-aqueous dispersion is at least 5% and less than 70% by weight of the dispersion.

15. A method as claimed in claim 1 wherein the milling is carried out above 75° C.

* * * * *